United States Patent [19]
Tai

[11] Patent Number: 5,301,896
[45] Date of Patent: Apr. 12, 1994

[54] AUTO REWINDER FOR V8-TYPE VIDEO CASSETTE

[76] Inventor: David Tai, 1st Floor, No. 17, Lane 180, Ho Chiang Street, Taipei City, Taiwan

[21] Appl. No.: 924,910

[22] Filed: Aug. 5, 1992

Related U.S. Application Data

[63] Continuation-in-part of Ser. No. 832,055, Feb. 6, 1992, abandoned.

[51] Int. Cl.⁵ .............................................. G03B 1/04
[52] U.S. Cl. .................................. 242/198; 242/200
[58] Field of Search ............... 242/198, 200, 201, 202, 242/203, 204; 360/95

[56] References Cited

U.S. PATENT DOCUMENTS

| | | | |
|---|---|---|---|
| 3,429,519 | 2/1969 | Staar | 242/200 |
| 3,606,977 | 7/1969 | Kakiuchi | 242/200 |
| 4,117,520 | 9/1978 | Kajino et al. | 360/95 |
| 4,522,353 | 6/1985 | Yeh | 242/198 |
| 4,533,092 | 8/1985 | Cecchi et al. | 242/200 |
| 4,749,147 | 6/1988 | Chen | 242/201 |

Primary Examiner—Daniel P. Stodola
Assistant Examiner—John Rollins
Attorney, Agent, or Firm—Bacon & Thomas

[57] ABSTRACT

An auto rewinder for a video cassette includes a base, a tape leading mechanism mounted on the base for leading a portion of the tape out of the cassette, a locking mechanism to prevent the actuation of the tape leading mechanism when no tape cassette is loaded in the rewinder, a delay breaker mechanism for delaying the cutting off of the power supply to the motor to permit the tape to be drawn back into the cassette after rewinding has been completed. An ejection mechanism for automatically ejecting the cassette, the ejection mechanism being activated by increased tension in a spindle drive belt when rewinding is completed.

3 Claims, 10 Drawing Sheets

AUTO REWINDER FOR V8-TYPE VIDEO CASSETTE

CROSS-REFERENCE TO RELATED APPLICATION

This application is a continuation-in-part of U.S. patent application Ser. No. 07/832,055 entitled "Auto Rewinder for V8-type Video Cassette" filed on Feb. 8, 1992, and now abandoned.

FIELD OF THE INVENTION

The present invention relates to an auto rewinder for a video cassette.

BACKGROUND OF THE INVENTION

A new type of video cassette has recently been developed and is gaining in popularity day to day because the video camera is conveniently portable, and the cassette is small and thin, but is capable of recording at length. The cassette is different from the prevailing VHS and BETA cassettes in respect to its size and structure. The biggest difference between the types of cassettes lies in the tape leading post in the front of the cassette. In general, VHS and BETA cassettes both have "rotatable" tape leading posts in the front; when such a cassette is located in a rewinder for rewinding, the tape is not necessarily led out. Instead, direct rewinding of tape can be accomplished through the guidance of two rotatable tape leading posts mounted on the cassette. For the new type of video cassette, the tape leading posts on respective sides in the front are integrally molded together with the cassette so that they are non-rotatable. Before rewinding, therefore, the tape has to be lead out forward so as not to contact non-rotatable tape leading posts to protect the tape from being worn due to fast rewinding. Under such circumstances, even if the prevailing rewinder were changed in design to fit the size and shape of the new type of video cassette, it would still not satisfactorily rewind the video cassette.

Though there are some varieties of rewinder specifically designed for the new type of video cassette, all of their tape leading mechanisms move the two tape leading posts outwardly with motor power and further rely upon a complicated driving and holding mechanism for retaining the led-out tape leading posts temporarily at operating positions. Meanwhile, they have to pull the tape leading mechanism back to the non-operating position with motor power. Therefore, the whole structure is too complicated causing errors and frequent failures.

U.S. patent application Ser. No. 07/832,055, filed on Feb. 6, 1992, discloses an auto rewinder for rewinding the magnetic tape of the new type video cassette. Though it provides effective means to overcome the defects of the prior art, there still are improvements which can be made.

SUMMARY OF THE INVENTION

In view of this, an object of this invention is to provide an improvement for thoroughly solving the defects of its prior art by reducing the complexity of the tape leading mechanism, tape take-up and release driven by the motor. In the improved structure according to this invention, once the user has pushed down a Play Key, a tape leading mechanism will automatically lead the tape out of the cassette, rewind the tape, release the tape and eject the cassette as a result of tension from the tape at the end of rewinding. Above all, the tape leading mechanism is operative independently by pushing down the Play Key without the necessity of motor power and the tape leading mechanism is forced to return to the non-operative position automatically due to tension from the magnetic tape at the end of rewinding. A specially designed latch is provided for preventing operating error due to mistakenly pushing the Play key when the cassette is not yet loaded.

A rewinder suitable for the new type video cassette comprises a base; a first roller rotatably mounted in a first position on the base; a second roller rotatably mounted in a first position on the base; and a first tape leading member, pivotally mounted on the base. A first tape leading roller is rotatably mounted in a second position on the first leading member. A second tape leading member, is pivotally mounted on the base. A second tape leading roller is rotatably mounted on the second tape leading member. A driving member is slidably mounted on the base, the driving member including two driving portions that are operatively connected to the first tape leading member and the second tape leading member respectively so as to move the first tape leading roller and the second tape leading roller from non-operating positions to operating positions whereby video tape is led out of the cassette; and to move the first tape leading roller and the second tape leading roller from their operating positions to their non-operating positions whereby video tape is placed into the cassette. The driving member also has a first hook locking portion. A Play Key movably mounted on the base is operatively connected to the driving member and moves the driving member from a non-operating position to an operating position.

A pivoting deflecting member is connected to a first spindle and has two first belt wheels rotatably mounted on one end of the deflecting member. The other end of the deflecting member has a second hook locking portion for engaging the first hook locking portion of the driving member whereby the driving member is held in the operating position. A second belt wheel is securely mounted on the first spindle. A belt driven by a motor is wound over the second belt wheel and the two first belt rollers whereby the first spindle can be rotatably driven by the motor for rewinding the tape. When the rewinding operation is accomplished, a taking-up force on the side of the belt is transmitted through one of the first belt wheels for pulling the deflecting member whereby the second hook locking portion of the deflecting member is forced to disengage from the first hook locking portion of the driving member whereby the driving member reverses to the non-operating position.

DETAILED DESCRIPTION OF THE PREFERRED EMBODIMENT

Figure 4:
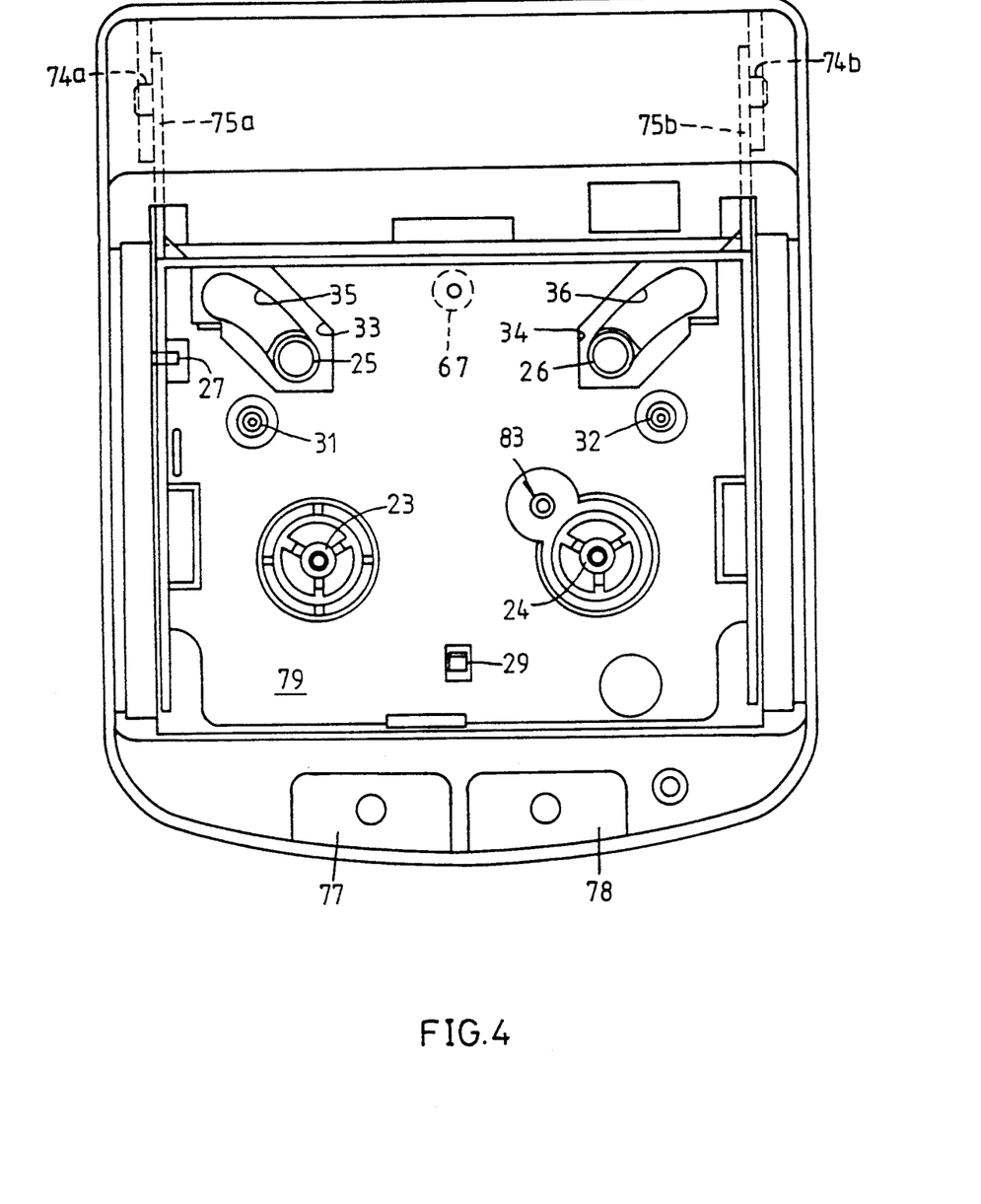
FIG. 4 is a top plan view, with the cassette cover of the rewinder removed, in accordance with the present invention.
Figure 6:
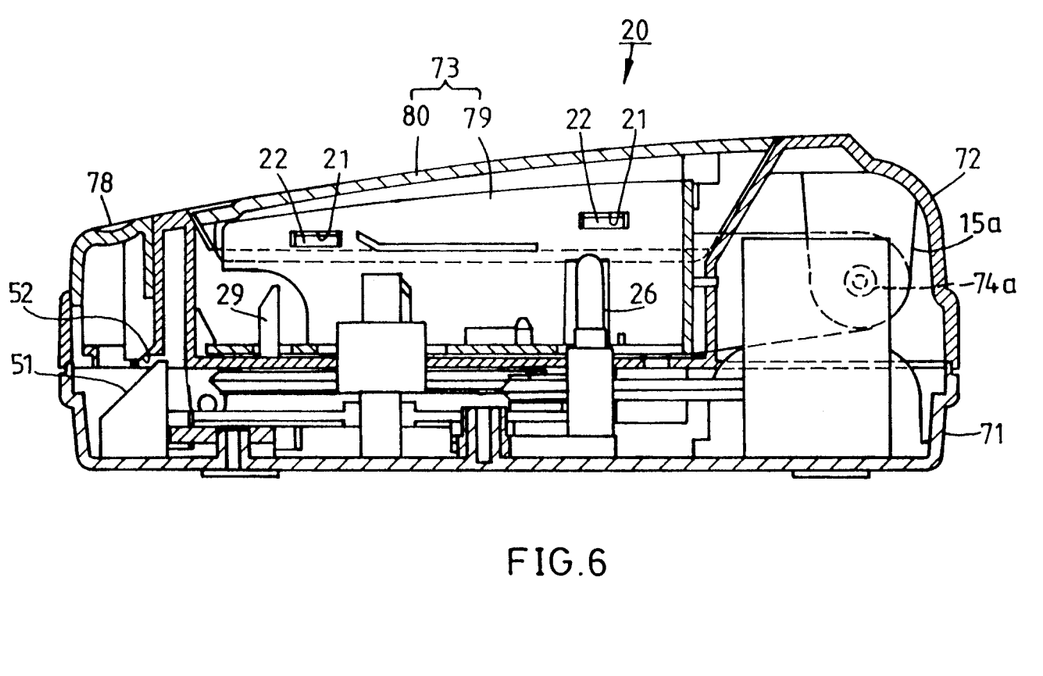
FIG. 6 is a cross sectional elevational view taken along line 6—6 of FIG. 3.

Referring to FIGS. 1, 2, 3 and 6, a rewinder 20 for the new type of video cassette comprises a base 71, an intermediate cover 72 that is latched on the top of the base 71 by means of a tenon connection; and a cassette holder 73 that is pivotably mounted by pivoted arms 75a and 75b to the intermediate cover 72 by means of two pivots 74a, 74b respectively (as illustrated in FIGS. 4 and 6).

Figure 1:
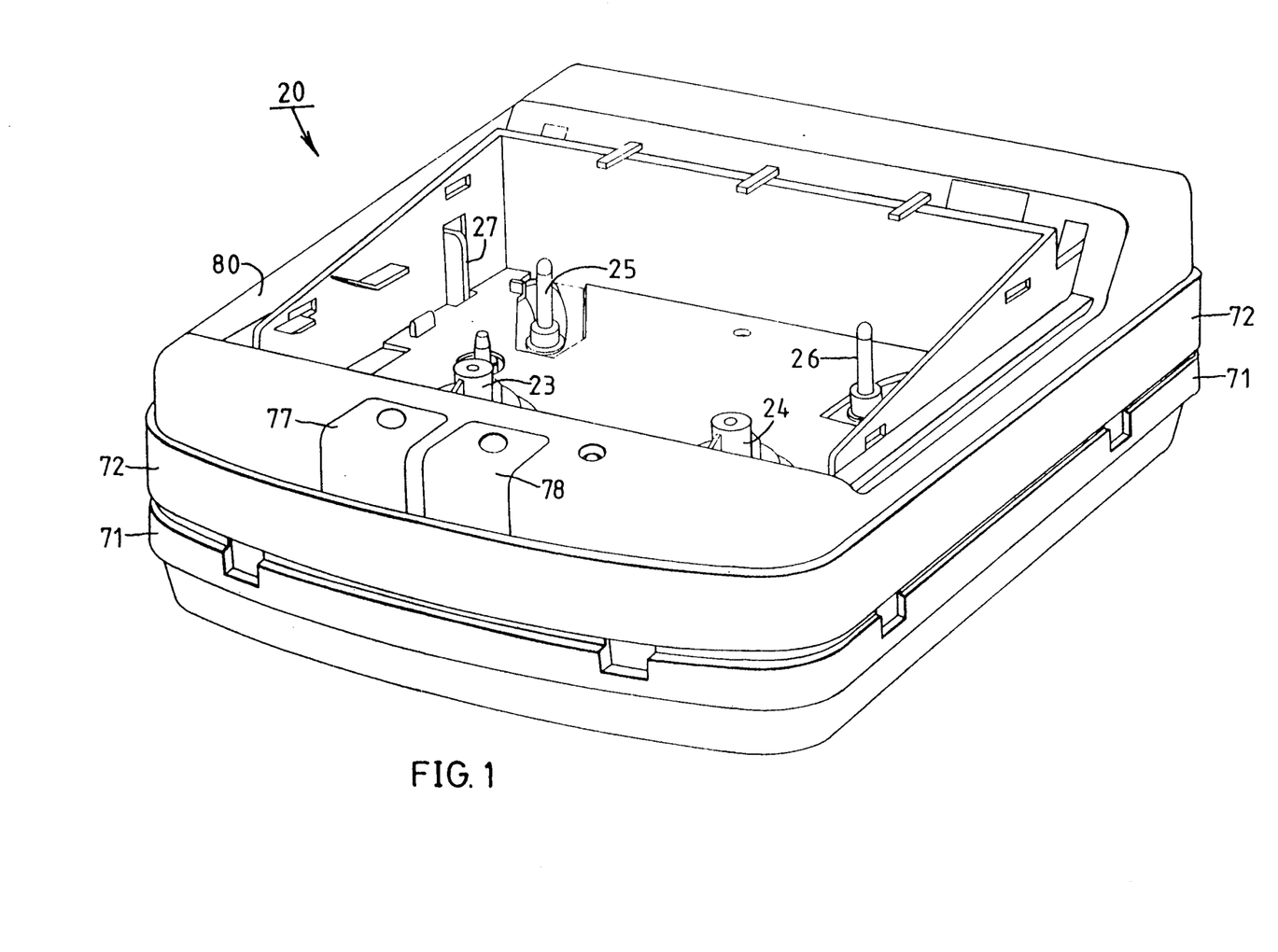
FIG. 1 is a top, front and right side perspective view, showing the rewinder in a closed state, in accordance with the present invention.
Figure 2:
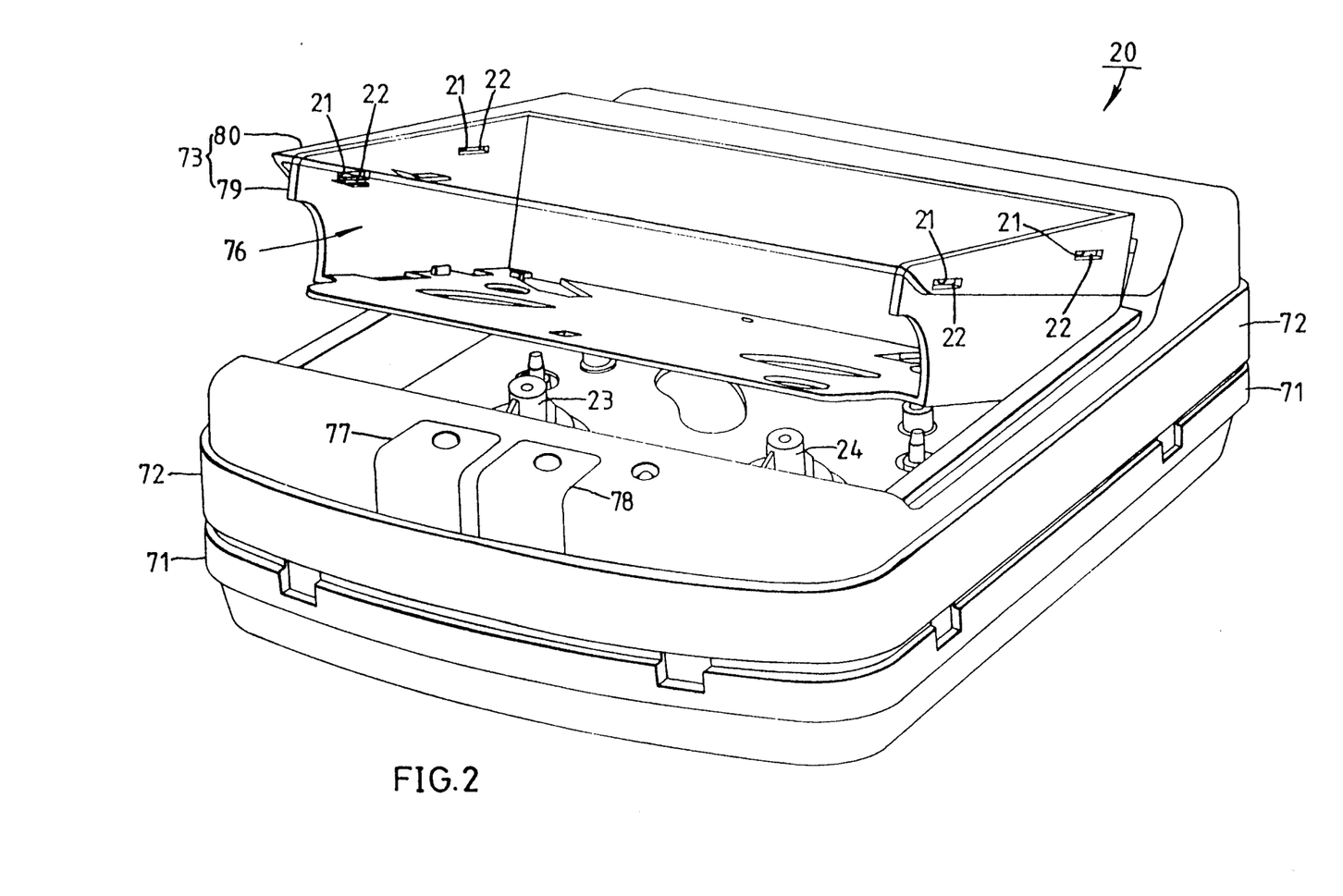
FIG. 2 is a top, front and right side perspective view, showing the rewinder in an open state, in accordance with the present invention.
Figure 3:
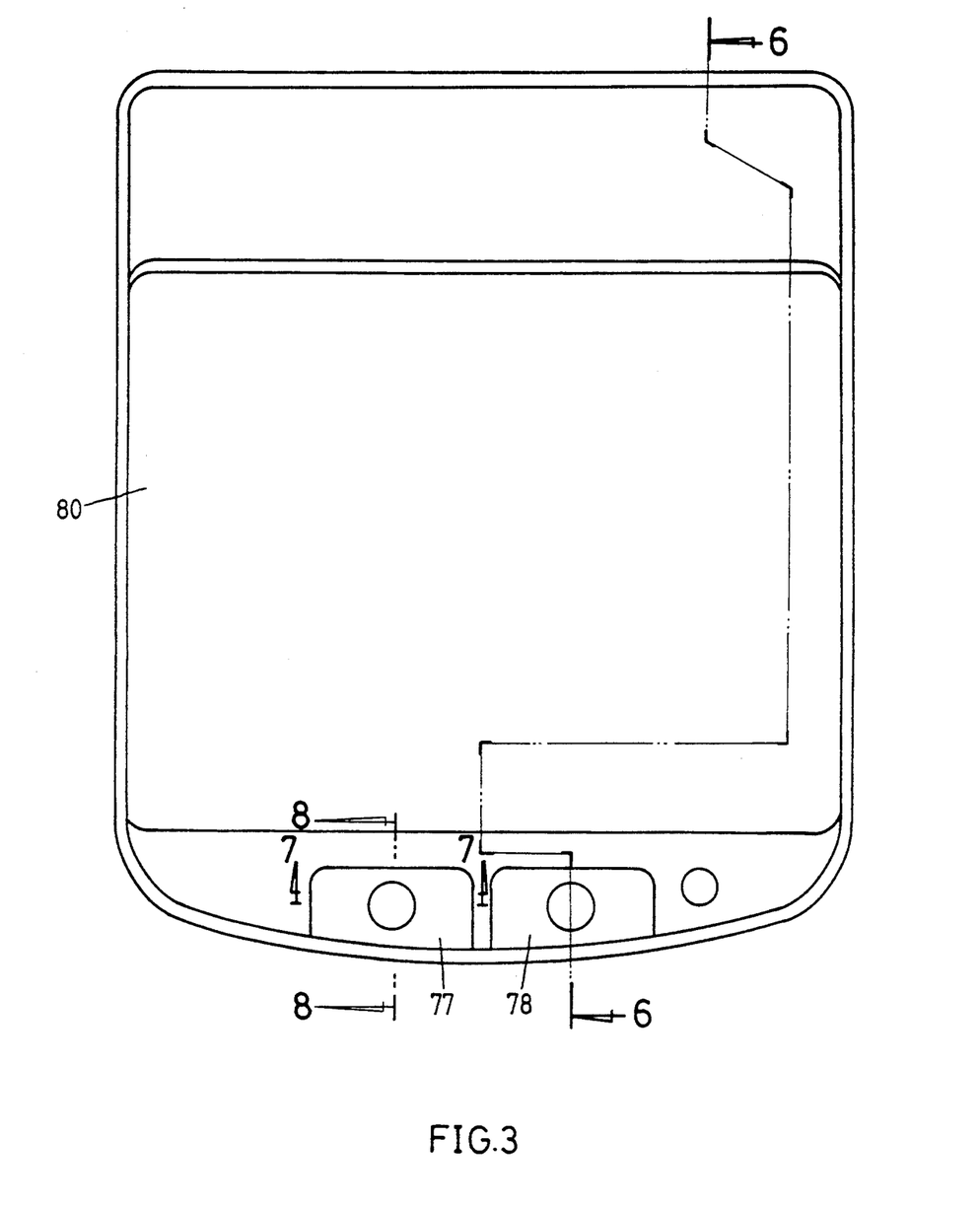
FIG. 3 is a top plan view in accordance with the present invention.

Referring to FIG. 2, there is an opening 76 in front of the cassette holder 73 for inserting or ejecting a new type video cassette (not shown). There is an intermediate cover 72 in front of two Play Keys 77 and 78, of which Play Key 77 is provided for stopping rewinding and ejecting the cassette holder 73, and Play Key 78 is provided for leading out and starting the rewinding of the tape.

Referring to FIGS. 2 and 6, the cassette holder 73 comprises a holder 79 and a cover 80. The holder 79 includes a mortise 21, and the cover 80 includes a tenon 22. When the tenon 22 and mortise 21 are connected together, the cover 20 is latched on the holder 79 to form a complete cassette holder 73.

Referring to FIG. 4, it is a top plan view, showing the holder 79 with the cover 80 removed. It includes two spindles 23 and 24, two tape leading rollers 25 and 26, and two location portions 31 and 32. Cover lifting portion 27 is provided to lift up the front cover of the new type video cassette (not shown) and unlatch portion 29 is provided to release the claws inside the new type video cassette whereby its spools can be freely rotated. While the two location portions 31 and 32 are provided for inserting the two location holes of the new type video cassette to position the cassette to rewind the tape. The two spindles 23 and 24 are provided for inserting into each spool of the new type video cassette so as to drive the tape rollers for rewinding. The two tape leading rollers 25 and 26 are provided for inserting against the internal side of the tape and pulling out the tape so as to prevent the tape from contacting the cassette and make the rewinding quicker. Further there are two openings 33 and 34 on the holder 79 to permit the two tape leading rollers 25 and 26 to penetrate upwardly out of the base. The intermediate cover 72 under the holder 79 includes two arc-shaped openings 35 and 36 to permit the tape leading rollers 25 and 26 to penetrate upwardly.

Figure 5:
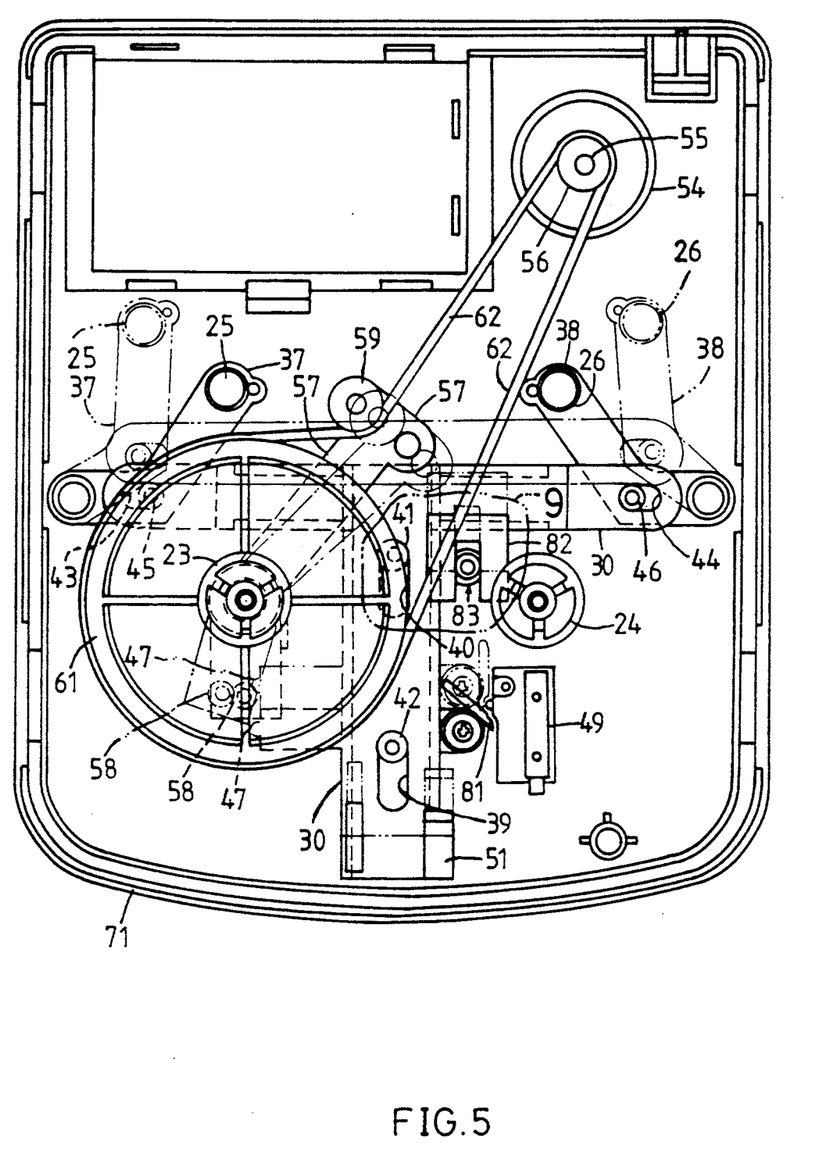
FIG. 5 is a top plan view, with the cassette cover and an intermediate cover of the rewinder removed, in accordance with the present invention.

Referring to FIG. 5, it is a top plan view showing the rewinder with cassette holder 73 and intermediate cover 72 (as FIG. 2) removed, in accordance with the present invention. The present invention comprises a base 71. A second spindle 24 is rotatably mounted on the second position of the base 71. A first tape leading member 37 is pivotably mounted on the base 71. A first tape leading roller 25 is rotatably mounted on the first tape leading member 37. A second tape leading member 38 is pivotably mounted on the base 71. A second tape leading roller 26 is rotatably mounted on the second tape leading member 38. A driving member 30 is slidably mounted on the base 71 by means for guide slots 39 and 40, and guide posts 41 and 42 on the base 71. The driving member 30 has two driving portions 43 and 44, and such two driving portions 43 and 44 are operatively connected with the guide post 45 of the first tape leading member 37 and guide post 46 of the second tape leading member 38 respectively so as to move the first tape leading roller 25 rotatably mounted on the first tape leading member 37 and the second tape leading roller 26 rotatably mounted on the second tape leading member 38 from the non-operating position to the operating position (as marked by the dashed lines) whereby the tape is led out of the new type video cassette. The first tape leading roller 25 and the second tape leading roller 26 are removed from the operating position to the non-operating position to reverse the tape back into the cassette. The left side (as viewed in FIG. 5) of the driving member 30 includes a first hook locking portion 47.

Referring to FIGS. 5 and 6, the driving member 30 has an oblique plane 51 on the lower end and there is a push key 78 slidably mounted on the upper side of the oblique plane 51 of the driving member 30. The push key 18 has an oblique plane 52 on the bottom portion. The two oblique planes 51 and 52 contact each other and are relatively slidable. When the push key 18 is pushed down, the oblique plane 52 of the push key 78 forces the oblique plane 51 of the driving member 30 to move as shown in dashed lines in FIG. 5, i.e. to force the driving member 30 to move from the non-operating position to the operating position.

Referring to FIG. 5, a motor 54 is securely mounted on the base 71 and has a belt wheel 56 mounted on the shaft 55 of the motor 54.

A deflecting member 57 is pivotally connected to the first spindle 23, the two first belt wheels 59 are rotatably mounted on one end of the deflecting member 57. The other end of the deflecting member 57 has a hook locking portion 58 for hooking up with the hook locking portion 47 of the driving member 30 so as to hold the driving member 30 at the operating position. A second belt wheel 61 is securely mounted on the first spindle 23. A belt 62 driven by the motor 54 is wound over the second belt wheel 61 onto the two first belt wheels 59 so as to rotate the first spindle 23 with the motor 54 for rewinding the tape. When rewinding is accomplished, a take-up force on the side of belt 62 is transmitted through the first belt wheel 59 for pulling the deflecting member 57 whereby the hook locking portion 58 of the deflecting member 57 is forced to disengage from the hook locking portion 47 of the driving member 30 whereby the driving member 30 is pulled back to the non-operating position as a result of magnetic tape tension.

Figure 7:
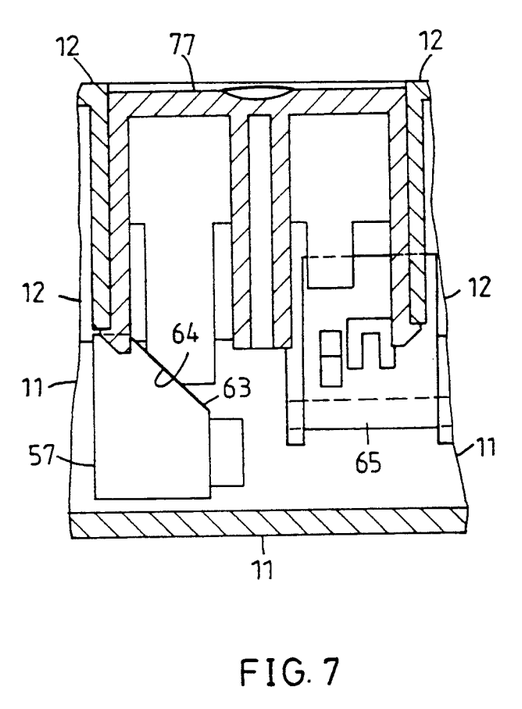
FIG. 7 is a partial cross-sectional, elevational view taken along line 7—7 of FIG. 3.
Figure 8:
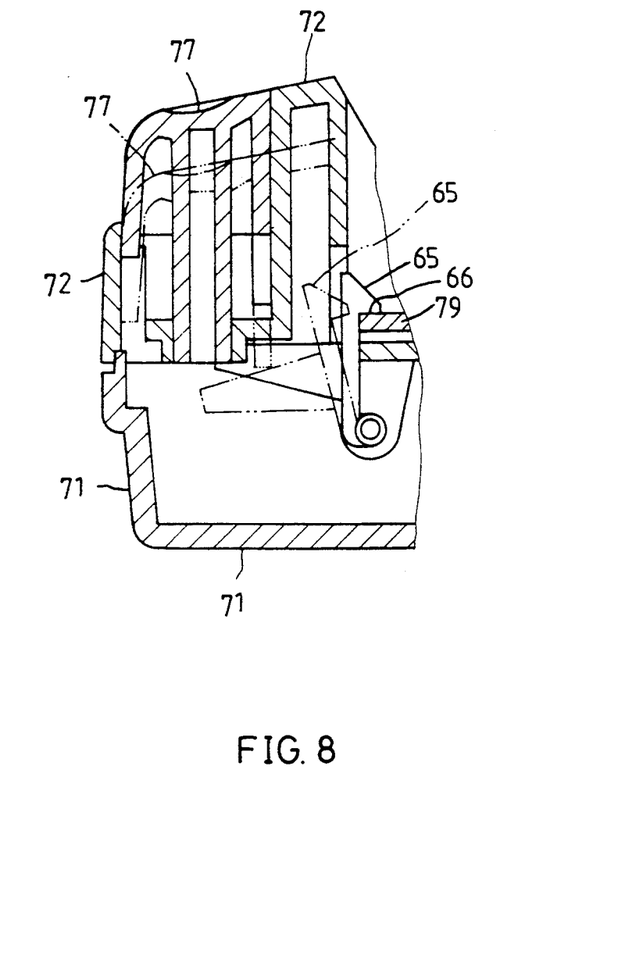
FIG. 8 is a partial, cross sectional elevational view taken along the line 8—8 of FIG. 3.
Figure 9:
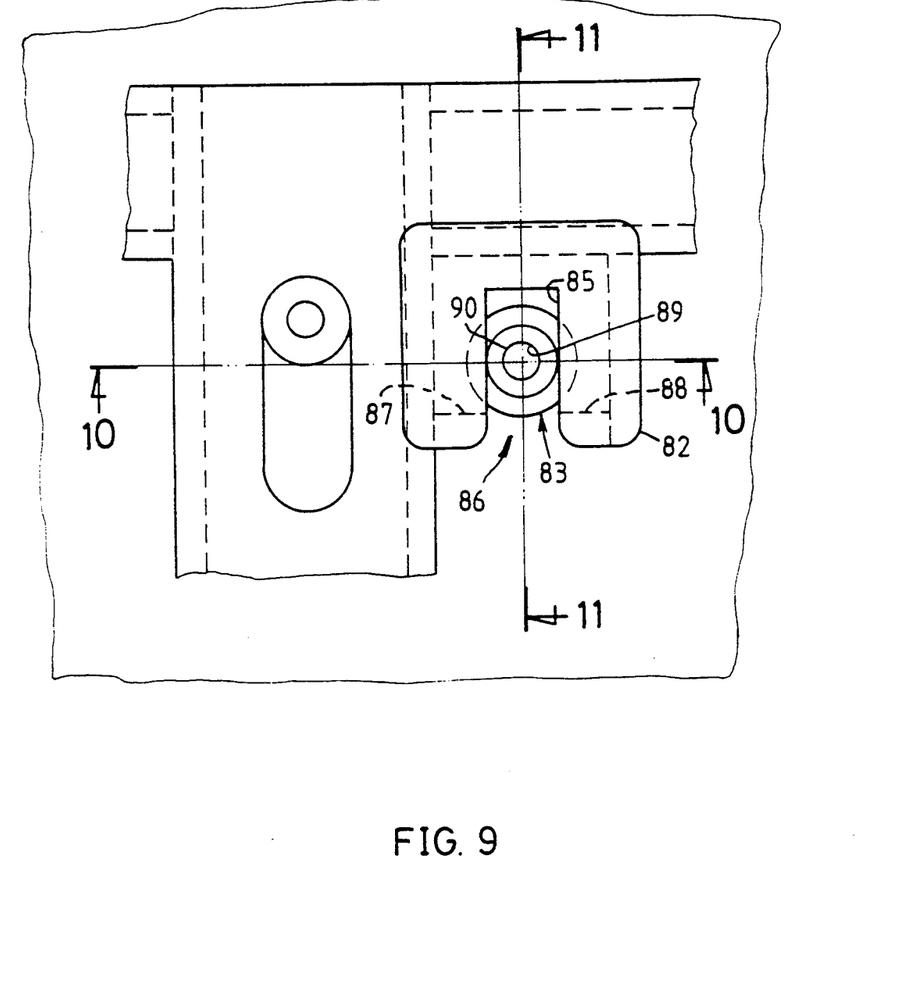
FIG. 9 is a partial, enlarged view of the area 9 of FIG. 5.
Figure 10:
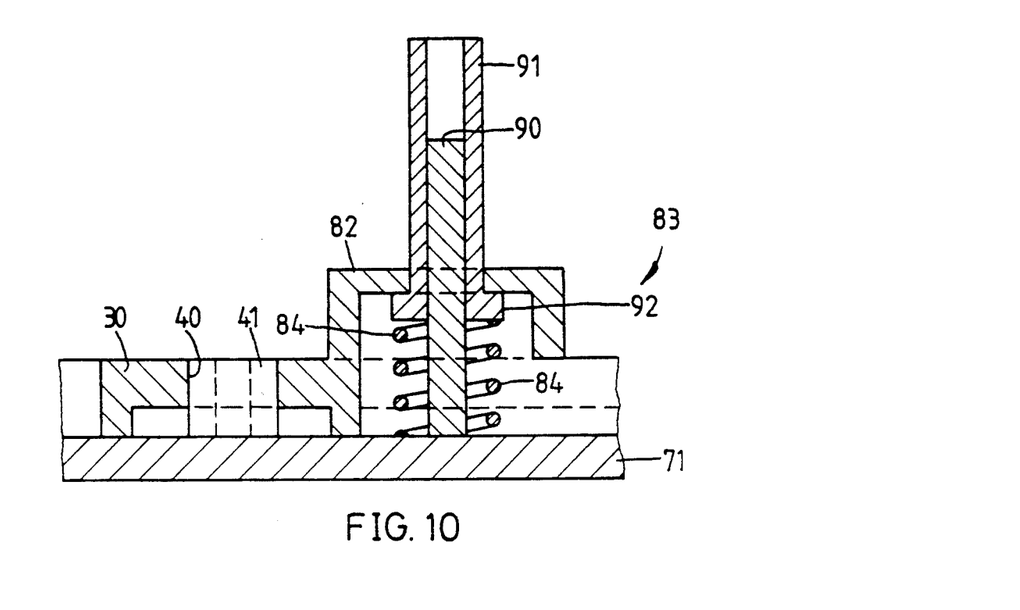
FIG. 10 is a partial, cross-sectional elevational view taken along line 10—10 of FIG. 9.
Figure 11:
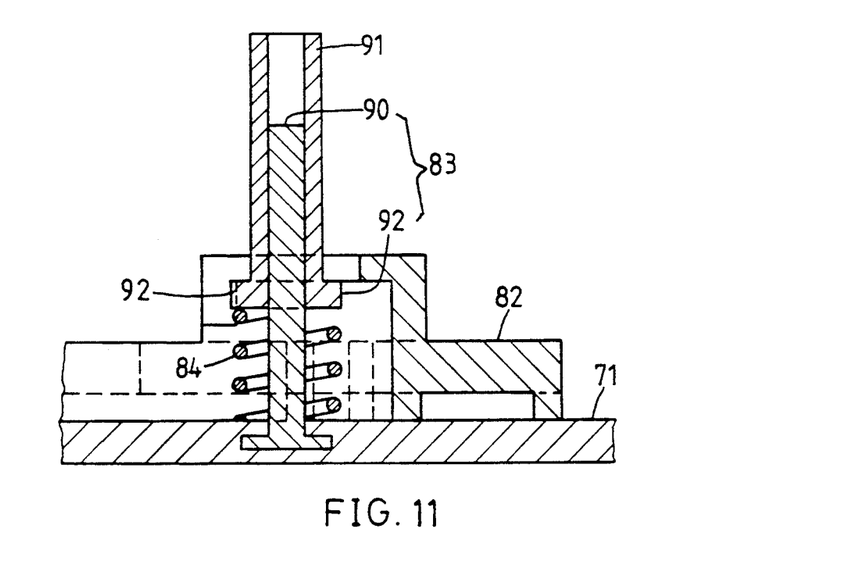
FIG. 11 is a partial cross sectional view taken along line 11—11 of FIG. 9.

Referring to FIGS. 4, 5, 7 and 8, one end of the deflecting member 57 incorporates an oblique plane 63 and there is an oblique plane 64 formed on the bottom side of the push key 77. These two oblique planes 63 and 64 contact each other. When the push key 77 is pushed down, the oblique plane 64 of the push key 77 shall force the oblique plane 63 of the deflecting member 57 to move to the left as shown in FIG. 7 whereby the hook locking portion 58 of the deflecting member 57 is forced to depart from the hook locking portion 47 of the driving member 30 whereby the driving member 30 is reversed from the operating position to the non-operating position. The hook locking member 65 pivotably mounted under the push key 77 is forced by the push key 77 to depart from the hook locking portion 66 of the cassette holder 73 that is lifted upwardly as result of resilience from the spring 67 to permit the user to stop rewinding and remove video cassette.

Referring to FIG. 5, there is a power switch 49 on the base 71, i.e. at the right side of the driving member 30. There is an actuating member 81 pivotably mounted on the right side of the driving member 30. The actuating member 81 is pivotably mounted on the right side of the driving member 30 by means of a pivot and there is high viscosity grease filled between the actuating member 81 and the driving member 30 for producing damping action therebetween.

Referring to FIGS. 5, 9, 10, 11, to avoid pushing down the Play Key to cause continuous running of the motor without the cassette being loaded (if the rewinder fails to load the cassette, once the motor is started, it continues to run without stopping unless the Stop Key is pushed down otherwise the motor will be burned down or the battery will be used up), there is a locking portion 82 extending from the right side of the driving member 30, and there is a spacing between the locking portion 82 and the base 71. On the base 71 there is a locking member 83 movable up and down and a spring 84 which allows the locking member 83 to move up and down. There is a slot 85 in the middle of the locking portion 82. One end of the slot 5 has an opening 86 and each side under the opening 6 has respective baffle portions 87, 88. There is a hole 89 in the middle of the locking member 83 in which is located an upright support 90 rising from the base 71. The locking member 83 has a latching member 91 and latch portion 92 wherein the latch portion 92 is wider than the opening 86 (i.e. the opening 86 between the two baffle portions 87, 88). The spring 84 is cased at the outer edge of the support 90. The lower end of the spring 84 is in contact with the base 71 and the upper end in contact with the latch portion 92 to bias the latch portion 92 against the bottom surface of the locking port ion 82. As the opening 86 of the locking portion 82 is narrower than the latch portion 92 so it has formed a locking function against the driving member 30 to prevent the driving member 30 from moving. Once the latching member 91 is pushed down, the latch portion 92 is liberated from the control of the opening 86 whereby the driving member 30 becomes movable.

For rewinding, with the front cover of a new type video cassette facing forward its is placed into the cassette holder 73, which is then pushed down. The latching member 91 is pressed down by the cassette holder 73 to liberate the latch portion 92 from the control of the opening 86 and to cancel the locking function against the driving member 30. Meanwhile the hook portion 66 under the cassette holder 73 is hooked up by the deflecting member 57. When Play Key 78 on the right side is pushed down by the user, the oblique plane 52 of Play Key 78 pushes against the oblique plane 51 of the driving member 30 whereby the driving member 30 is guided by the guide posts 41 and 42 to move from their non-operating positions to their operating positions. The two tape leading members 37 and 38 together with two tape leading rollers 25 and 26 are forced to move from their non-operating positions to their operating positions. Therefore, the tape is pulled forwardly out of the cassette. The hook locking portion 47 of the driving member 30 and the hook locking portion 58 of the deflecting member 57 are latched to each other whereby the driving member 30 is held in the operating position. When the driving member 30 is moving close to the operating position, the actuating member 81 pivotably mounted on the right side of the driving member 30 actuates the power switch 49. The hook portion 58 of the deflecting member 57 also retains the hook portion 47 of the driving member 30 whereby the driving member 30 can be positioned at the operating position. When power switch 49 is actuated the motor 54 starts running to rotate the first spindle 23 on the by virtue of the belt wheel 56, belt 62 and belt wheel 61 for rewinding the tape.

When rewinding is accomplished, the tension in the magnetic tape increases which is transmitted through the two tape leading members 37, 38 to force the driving member 30 to move from the operating position to the non-operating position. If the tape tension is large enough to cause the hook portion 47 of the driving member 30 to disengage from the hook portion 58 of the deflecting member 57, the driving member 30 and two tape leading members 37, 38 will revert to the non-operating position smoothly from the operating position. To avoid the breakage of the magnetic tape due to excessive tension, the shape and size of the hook portion 47 on the left side of the driving member 30 and the hook portion 58 of the deflecting member 57, and deflecting force of the belt 62 employed on the deflecting member 57 are appropriately determined during the time of design.

At the end of rewinding, the time for cutting power supply to the motor 54 becomes especially important. The time for cutting off the power supply for the motor 54 must be appropriate for the magnetic tape to be completely rewound in the cassette. Before the driving member 30 completely reverses to the non-operating position, due to damping action between the actuating member 81 and the driving member 30, the actuating member 81 does not cut off the power switch 49 right after the driving member 30 is reversed. Instead it delays for some time to release the power switch 49 whereby the delay of cutting off the power supply is in due time for the magnetic tape completely rewound in the cassette. Because the magnetic tape is completely rewound, it will not be damaged by pulling when the cassette holder 73 is lifted. When the magnetic tape is completely received, the cassette holder 73 will be slowly lifted due to the help of the grease damping mechanism pivotably mounted on the pivots 75a, 75b and spring 67.

The present invention is to provide an improvement for thoroughly solving the structural defects of prior art such as the complexity of the tape leading mechanism; the premature failure; and the tape take-up and release driven by motor. The improved structure in accordance with the present invention, once the user has pushed down Play Key 78, its tape leading mechanism will automatically lead the tape out of the cassette, rewind the tape, release the tape and eject the cassette the whole rewinding procedure is accomplished automatically. Above all the tape leading mechanism is operative independently by pushing down the Play Key without necessity of motor power. Therefore, the structure of the invention as a whole is much simpler, but more reliable in operation. Meanwhile the magnetic tape can be safely rewound in the cassette due to the damping action formed between the actuating member 57 and the driving member 30. Further with the help of mutual cooperation between the locking portion 82 of the driving member 30 and the locking member 83, Play Key 78 can only be pushed down when the cassette is loaded in the holder 73 in order to avoid the risk of operating error.

What is claimed is:

1. An auto rewinder for a video cassette comprising:
   a) a base;
   b) a first spindle rotatably mounted in a first position on the base for engaging a tape spool of the video cassette;
   c) a second spindle rotatably mounted in a second position on the base for engaging a tape spool of the video cassette;
   d) a first tape leading member pivotally mounted on the base;
   e) a second tape leading member pivotally mounted on the base;
   f) a first tape leading roller rotatably mounted on the first tape leading member;
   g) a second tape leading roller rotatably mounted on the second tape leading member;
   h) a driving member slidably mounted on the base so as to be movable between a non-operating position and an operating position and having driving portions operatively connected to the first tape leading member and the second tape leading member respectively, the driving member having a first hook portion;
   i) a play key movably mounted on the base and operatively connected to the driving member such that movement of the play key moves the driving member from the non-operating position to the operating position;
   j) a deflecting member connected to the first spindle, the deflecting member having a first end and a second end, the first end having a second hook portion for engaging the first hook portion of the driving member to keep the driving member in the operating position;
   k) a first belt wheel rotatably mounted on the second end of the deflecting member;
   l) a second belt wheel attached to the first spindle;
   m) a belt driven by a motor, the belt contacting a side of the first belt wheel and contacting the second belt wheel so as to cause deflection of the deflecting member by virtue of the belt tension on the first belt wheel thereby causing the second hook portion of the deflecting member to disengage from the first hook portion of the driving member when the belt tension reaches a predetermined level; and
   n) a locking assembly comprising
      i) a locking portion connected to the driving member so as to move therewith, the locking portion defining a slot having an opening;
      ii) baffles connected to the locking portion and located on opposite sides of the opening;
      iii) a latching member attached to the base and extending through the opening, the latching member having a latch portion and being movable between a first position in which the latch portion contacts the baffles thereby preventing movement of the driving member from its non-operating position toward its operating position, to a second position by the insertion of the cassette into the rewinder in which the latch portion does not contact the baffles, thereby allowing the driving member to move toward its operating position; and,
      iv) biasing means associated with the latching member so as to bias the latching member toward its first position.

2. The auto rewinder of claim 1 wherein the biasing means comprises a coil spring.

3. The auto rewinder of claim 1 further comprising:
   a) an electric motor attached to the base and driving the belt;
   b) electrical switch means attached to the base and electrically connected to the motor so as to control the stopping and starting of the electric motor; and,
   c) actuating means operatively associated with the driving member and the electrical switch means such that movement of the driving member toward its operating position actuates the electrical switch such that the motor operates to drive the belt.

* * * * *